April 29, 1924.
R. C. BARKER
TIRE
Filed May 11, 1923
1,492,064
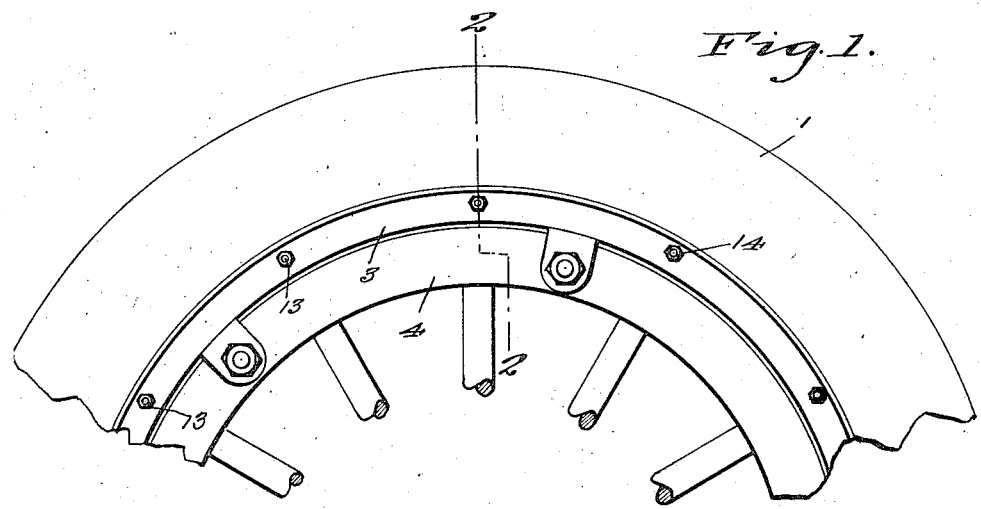
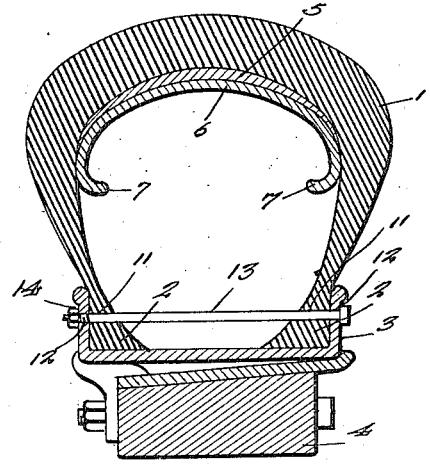
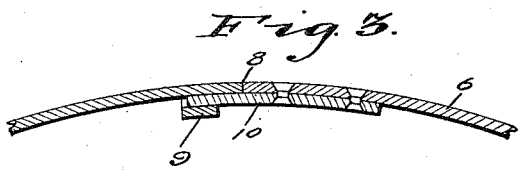
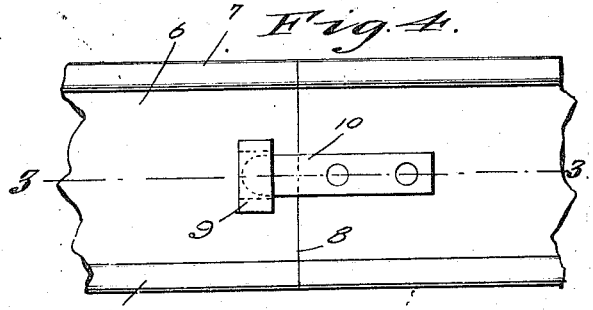
R. C. Barker INVENTOR
BY Victor J. Evans ATTORNEY
WITNESSES Patented Apr. 29, 1924.

1,492,064

UNITED STATES PATENT OFFICE.

ROLLO C. BARKER, OF HAYDEN, ARIZONA.

TIRE.

Application filed May 11, 1923. Serial No. 638,312.

*To all whom it may concern:*

Be it known that I, ROLLO C. BARKER, a citizen of the United States, residing at Hayden, in the county of Gila and State of Arizona, have invented new and useful Improvements in Tires, of which the following is a specification.

The present invention comprehends the provision of a resilient tire for vehicles and its primary object is to produce a tire which dispenses with the pneumatic principle now commonly employed.

A further object is to provide a means whereby the tire will possess a maximum amount of resiliency and durability and yet be of simple construction, one that can be easily repaired when damaged and which may be used on automobile wheels now constructed and can be easily applied to the rim of such wheels with very slight changes thereto.

Another object is to produce a means which can be easily adapted to be used in combination with the tire casing now on the market and which comprises a resilient band to be positioned within the casing, but spaced from the upper inner wall thereof by a shock absorbing strip which not only protects the casing but materially adds to the flexibility of the tire, and this above referred to combination will produce a resilient tire which is capable of sustaining the weight of the car to which it is attached and yet contain a sufficient amount of resiliency for easy riding and be practically immune from punctures and the like which tires that employ the pneumatic principle are subject to.

A still further object is to produce a substantial and simple means for securing the tire casing to the rim of the wheel after the resilient band and shock absorbing strip is positioned therein, and such means constitutes bolts, which are passed through the rim of the wheel and the beads of the tire casing respectively.

This invention also consists in certain other features of construction and in the combination and arrangement of the several parts, to be hereinafter fully described, illustrated in the accompanying drawings and specifically pointed out in the appended claim.

In describing the invention in detail reference will be had to the accompanying drawing wherein like characters denote like or corresponding parts throughout the several views and in which:—

Figure 1 is a fragmentary side elevation of a tire casing for the purpose of illustrating my improvement.

Figure 2 is a sectional view taken approximately on line 2—2 of Figure 1.

Figure 3 is a sectional view taken approximately on line 3—3 of Figure 4.

Figure 4 is a fragmentary view of the resilient band showing the securing means for the ends thereof.

Referring now to the drawings in detail an ordinary tire casing is broadly indicated by the numeral 1. This casing has the usual beads 2 formed on its edges and are shown in the drawings positioned as usual for engaging the inner edges of the rim 3, which is secured to the felly 4.

Positioned within the casing and engaging the wall intermediate of the side walls and being shaped to conform to the cross sectional curvature of the tire casing there is a shock absorbing protector strip 5, constructed preferably of material of sufficient yieldability to properly space a substantially semi-circular in cross section metallic resilient band 6 which engages the strip in its entirety and extends slightly beyond the side edges thereof. The side edges of this resilient band are curved inwardly as at 7 and are spaced a considerable distance from the rim 4 as clearly shown in the drawings. This band is of a nature to permit sufficient expansion to keep the side walls of the tire from collapsing when the tire is secured to the rim. It should be stated that this band 6 will be made in different sizes suitable for different size tires and each band should be slightly larger than the tire casing in which it is to be used so that it is necessary to force the tire around the band when the tire is being secured to the rim, in a manner which will be presently described. The band 6 is also transversely split as at 8 and its ends are secured together, such securing means consisting of a lug 9 rigidly secured adjacent one end and a tongue 10 is carried by the opposite end and adapted to be received in a recess longitudinally formed in the lug 9.

After the shock absorbing protector strip is suitably placed in the tire casing 1, the resilient band is inserted and positioned as before described with its ends suitably secured together. Apertures 11 are formed at regular intervals in the bead and passing through these apertures and similar spaces apertures 12 in the rim are headed bolts 13 which extend through both sides of the rim as shown. The opposite bead of the casing is also apertured as at 13 and receives the opposite end of the bolts. Nuts 14 are operatively associated with the bolts 11.

It is thought from the foregoing description that the advantages and novel features of the invention will be readily apparent and desired that it be understood that certain changes in the construction and arrangement of the several parts will be made, provided that such changes fall within the scope of the appended claim which is as follows:—

The combination with a rim of a vehicle and a tire casing, of a transversely split band having its ends detachably secured and arranged in confronting contacting engagement, said band having its sides bent downwardly and inwardly in unobstructed parallel relation and being slightly larger in cross section than the normal cross sectional shape of the casing, a protective strip engaging the inner wall of the casing and spacing the band from the inner periphery thereof, said band being adapted to force apart the side walls of the casing to prevent the collapsing thereof and bolts passing through the beads of the casing and the rim respectively for the purpose specified.

In testimony whereof I affix my signature.

ROLLO C. BARKER.